March 20, 1956 — K. K. GARVER — 2,738,634
SELF-LOADING IMPLEMENT CARRIER
Filed June 12, 1952 — 2 Sheets-Sheet 1
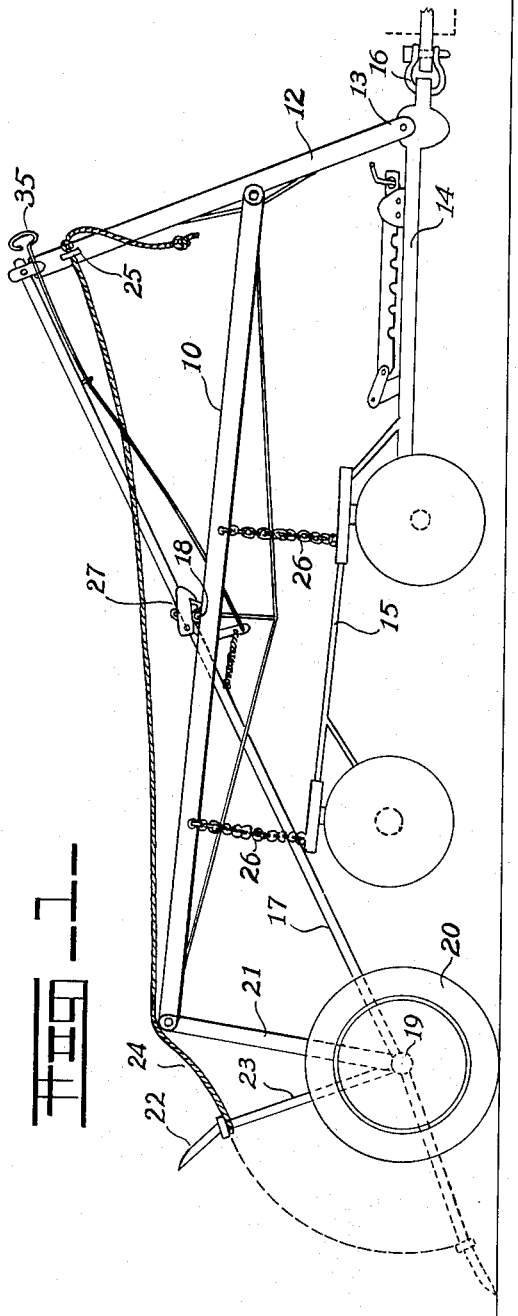
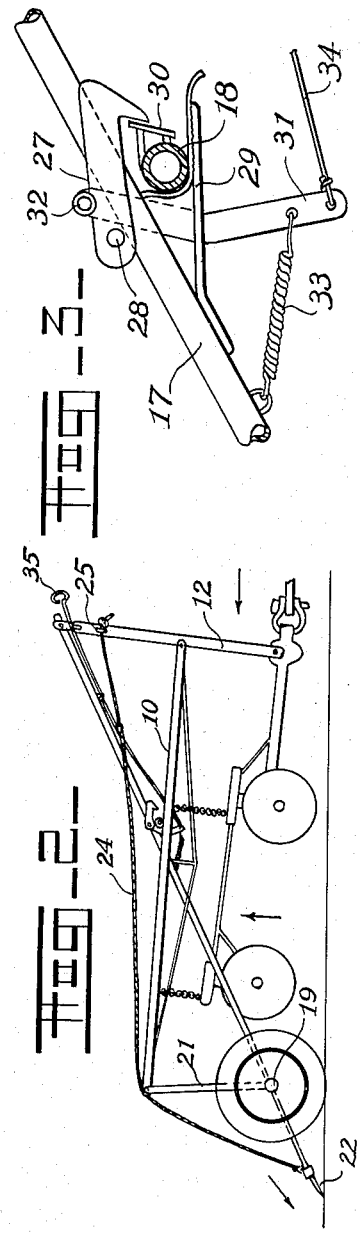
INVENTOR.
Kenneth K. Garver
BY
W. B. Harpman
ATTORNEY

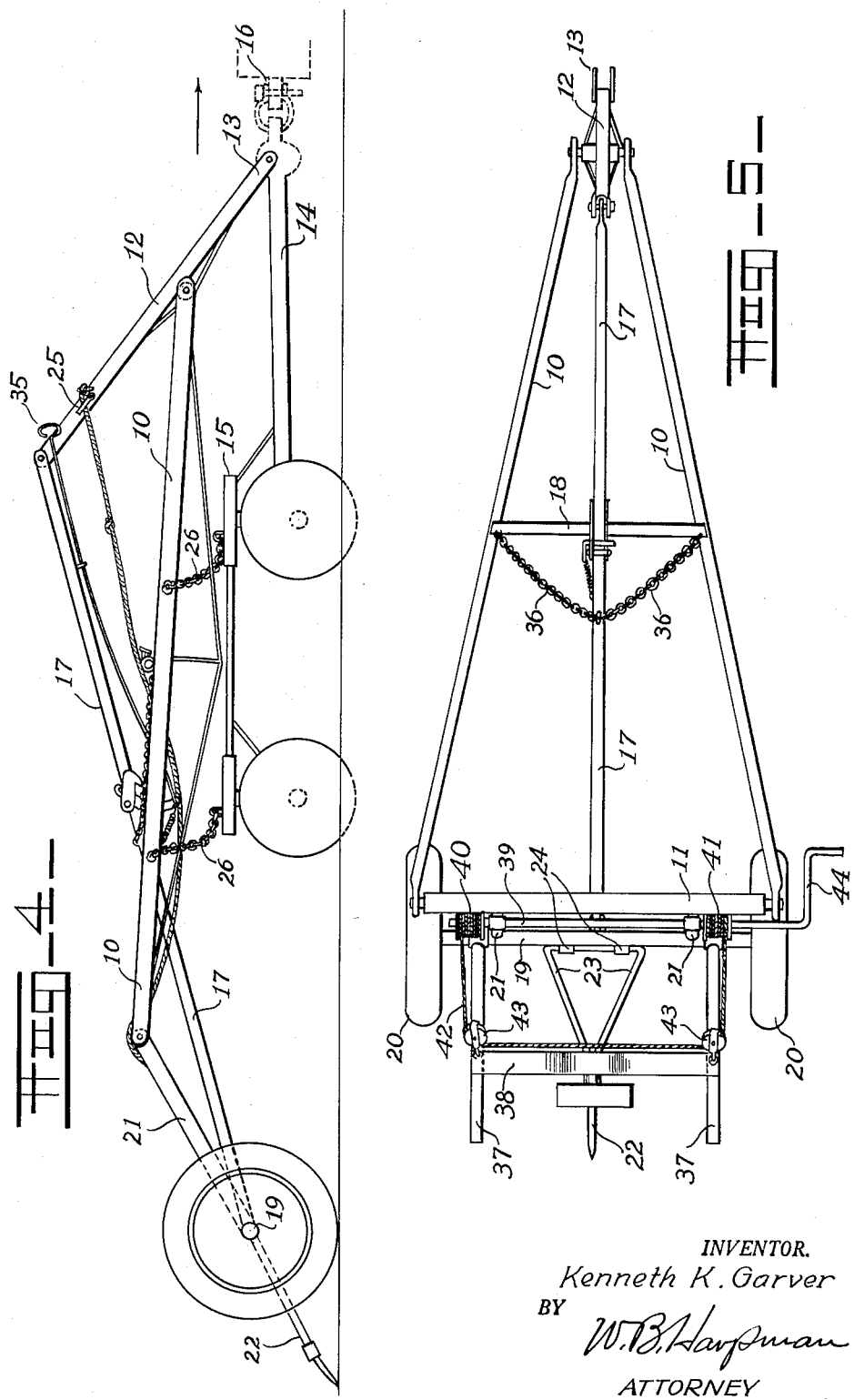

United States Patent Office 2,738,634
Patented Mar. 20, 1956

2,738,634

SELF-LOADING IMPLEMENT CARRIER

Kenneth K. Garver, Poland, Ohio

Application June 12, 1952, Serial No. 293,135

7 Claims. (Cl. 55—73)

This invention relates to a carrier for farm implements and the like and more particularly to an implement carrier which may be connected to a tractor and caused to raise and lower an implement by alternate forward and backing motion of the tractor and the carrier.

The principal object of the invention is the provision of a simple and relatively inexpensive implement carrier.

A further object of the invention is the provision of an implement carrier incorporating a manually operated locking device for maintaining portions of the implement carrier in elevated position.

A still further object of the invention is the provision of an implement carrier including a ground engaging anchor by means of which portions of the implement carrier may be rendered stationary with respect to other portions thereof.

A still further object of the invention is the provision of an implement carrier which may be used for carrying more than one farm implement or the like.

The implement carrier disclosed herein comprises an improvement in the art relating to such devices and specifically discloses a simple and efficient, easily operated carrier for agricultural implements such as disc harrows and the like.

It is well known that in many locations farmers find it necessary to transport disc harrows from one field to another requiring the use of a paved highway in making the transferral and in some instances moving the particular implement a considerable distance. As is also known in the art it is not practical to move the various farm implements such as disc harrows and the like over paved surfaces as such action would be detrimental to the implement itself as well as to the paved highway. Additionally, the implement can be transported at a more rapid rate if it is positioned on a carrier provided with suitable road engaging wheels.

The present invention accordingly discloses an implement carrier to which the implement may be more or less permanently attached and which is relatively light in weight and offers little resistance to towing so that it can be moved along with the implement in the field and at the conclusion of the operation used to elevate the implement and carry it to another location.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of the implement carrier in elevated position.

Figure 2 is a side elevation of the implement carrier with an anchoring portion thereof in ground engaging position.

Figure 3 is a cross sectional detail of a locking mechanism comprising a part of the implement carrier shown in Figures 1 and 2.

Figure 4 is a side elevation of the implement carrier in lowered position.

Figure 5 is a top plan view of the implement carrier showing a modified secondary carrier construction added thereto.

By referring to the drawings and Figure 1 in particular it will be seen that an implement carrier has been devised which comprises a longitudinally extending horizontally disposed V-frame 10, the rear ends of the V-frame 10 being spaced apart by and pivotally secured to a transverse frame member 11 and the front or apex end of the V-frame is pivotally secured to the approximate midpoint of a tongue or lever 12, the forward end 13 of which is bifurcated and adapted to be attached along with the tongue 14 of an implement 15 to a hitch 16 located, for example, on a tractor or the like. The upper rearwardly extending end of the tongue 12 of the implement carrier is pivoted to a longitudinal frame member 17 which is positioned over a secondary transverse frame member 18 of the V-frame 10.

The rearmost end of the longitudinal frame member 17 is pivoted to a transverse axle 19 and midway between the ends thereof, the ends of the axle 19 being provided with suitable ground engaging wheels 20—20. The axle 19 carries a pair of spaced, substantially vertically extending arms 21—21, the upper ends of which are secured to the transverse frame member 11 inwardly from the ends thereof. A pointed ground engaging anchor 22 having a bifurcated inner end 23 is pivotally mounted in brackets 24 on the axle 19 and a rope 24 is attached to the anchor 22 and trained upwardly over the transverse frame member 11 and forwardly to and through a bracket 25 on the tongue 12.

Chains 26—26 are attached to the V-frame 10 and depend therefrom and are adapted to connect with an implement such as the disc harrow 15 as illustrated in Figures 1, 2 and 4 of the drawings.

By referring now to Figure 3 of the drawings it will be seen that a latch 27 is attached by a transverse pivot 28 to the longitudinal frame member 17 at a point thereon substantially midway between its ends and adjacent the frame member 18 on the V-frame 10. A slotted bracket 29 is also attached to the longitudinal frame 17 beneath the pivot 28 and extends forwardly at an angle with respect to the longitudinal frame member 17 and defines a socket for the reception of the transverse frame member 18 which is provided at this point with a forwardly extending latch receiving portion 30. A lever 31 is positioned vertically through the slotted bracket 29 and has an offset upper end 32 overlying the latch 27 and the lower end of the lever 31 is normally urged rearwardly by a spring 33. A cable 34 is also attached to the lower end of the lever 31 and extends forwardly along the longitudinal beam 17 to a handle 35.

By referring now to Figures 1, 2 and 3 of the drawings it will be seen that in order to raise or lower the implement 15 the relative positions of the axle 19 and the bifurcated end 13 of the tongue 12 must be changed. In Figure 1 of the drawings the latch 27 is shown engaged upon the latch receiving portion of the transverse frame member 18 of the V-frame 10 thereby holding the axle 19 in fixed relation to the frame 10 and at the same time holding the tongue 12 in fixed relation to the frame 10. In such position the frame 10 is in relatively elevated relation to the ground or to the supporting surface of the device and an implement such as the disc harrow 15 will be suspended therebeneath and in condition for being transported thereby. It will also be observed that the ground engaging anchor 22 is in elevated position, the rope having been pulled forwardly through the bracket 25 and secured thereby.

At such time as it is desired to lower the implement 15, the action illustrated in Figures 2 and 4 of the drawings takes place and by referring to Figure 2 in particular it will be seen that the rope 24 has been released from the bracket 25 which permits the ground engaging anchor 22 to rest upon the ground or other supporting surface or whereupon the tractor is backed toward the carrier, as shown by the arrow in Figure 2 of the drawings. As the axle 19 is incapable of moving rearwardly due to the anchor 22, the longitudinal frame 17 moves forwardly and upwardly with respect to the transverse member 18 of the V-frame 10 and at the same time the tongue 12 pivots on the forward end of the V-frame 10. The latch 27 is thus moved away from the frame member 18 and the extension 30 thereon and is subsequently moved to an elevated position by manipulation of the cable 34 so that when the tractor is again moved forwardly the action illustrated in Figure 4 occurs and which comprises specifically the forward movement of the lower end of the tongue 12 which causes the upper end thereof to impart rearward movement to the longitudinal frame member 17 which in turn moves the axle 19 rearwardly with respect to its former position and as the V-frame 10 is pivoted to the vertical arms 21 on the axle 19 and to the tongue 12 it is accordingly moved downwardly to position the implement 15 in suitable ground engaging position therebeneath with the chains 26 being relatively slack.

Continued forward motion of the tractor results in pulling the implement 15 along the ground and the movement of the carrier thereover, the same remaining in the position illustrated in Figure 4 of the drawings, it being observed that it cannot collapse further due to the presence of restraining chains 36 which are positioned between the V-frame 10 and the longitudinal member 17, as best shown in Figure 4 of the drawings.

At such time as the use of the implement 15 is completed and it is desired to again carry the same, the tractor is reversed so as to move the bifurcated lower forward end 13 of the tongue 12 whereupon the anchor 22 again engages the ground and holds the axle 19 relatively stationary with respect thereto and as the tractor moves backwardly, the tongue 12 pivots on the forward end of the frame 10, which action moves the longitudinal frame member 17 and in effect elevates the V-frame 10 and the implement 15. At the present height the latch 27 again engages the bracket 30 on the transverse frame member 18 and the carrier is ready for forward carrying motion and during which motion the anchor 22 may be pulled up to the position shown in Figure 1 of the drawings by the rope 24.

An addition or modification of the carrier shown in Figures 1, 2 and 4 hereinbefore described may be made as shown in Figure 5 of the drawings and the addition thereto comprises the mounting on the axle 19 of a pair of spaced rearwardly extending secondary arms 37—37 which are joined intermediate their ends by an upwardly bowed frame member 38. The secondary arms 37 are adapted to be used in backing up various other implements in the manner of a fork or a lift truck, as known in the art, and in order that they can be moved vertically with respect to the pivoted engagement on the axle 19, a shaft 39 is positioned transversely of the arms 21 and a pair of reels 40 and 41 of greater diameter are positioned thereon with a flexible cable 42 wound around the reels 40 and 41 at its opposite ends and passed through pulleys 43 affixed to the secondary arms 37. A crank 44 formed on one end of the shaft 39 enables the same to be revolved in the manner of a winch. The difference in the diameters in the reels 40 and 41 causes the cable 42 to be wound onto the reel 41 at a more rapid rate than it is unwound from the reel 40 thereby providing a suitable ratio between the number of revolutions imparted the shaft 39 and the actual movement of the arms 37 and thus enabling the user to lift a relatively heavy piece of equipment. It will be obvious to those skilled in the art that the implement carrier as disclosed may be made with or without the arms 37 or without departing from the spirit of the invention as disclosed.

Having thus described my invention, what I claim is:

1. An implement carrier comprising a longitudinally extending V-frame, a generally vertically disposed lever pivoted inwardly of one of its ends to one end of said V-frame, arms pivoted to the opposite end of said V-frame, an axle connected to said arms and ground engaging wheels on said axle, a ground engaging anchor pivoted to said axle and swingable in an arc thereabout, a longitudinal frame member having one of its ends pivoted to one end of said lever at a point above the connection of said lever with said V-frame and connected at its other or rearmost end with said axle with the latter disposed below the connection of said arms with said V-frame, and latch means on said longitudinal frame member engaging a portion of said V-frame to hold said axle, arms and lever in fixed spaced relation to one another, and means on said V-frame for supporting an implement in elevated relation when said arms and lever are in substantially vertical position, said arms and lever being movable to inclined position to lower said V-frame and said implement.

2. The implement carrier set forth in claim 1 and wherein said portion of the V-frame includes a transverse member engageable with said latch means.

3. The implement carrier set forth in claim 1 and wherein a control rod for said latch means is positioned on said longitudinal frame and extends to a point beyond one end thereof.

4. The implement carrier set forth in claim 1 wherein the other end of said lever is provided with means engageable with a tractor hitch.

5. The implement carrier as set forth in claim 8 wherein a control rope is attached to said ground engaging anchor and extends longitudinally of the carrier to a point on said lever to permit said ground engaging anchor to be manipulated thereby.

6. An implement carrier having a longitudinally extending main frame formed of spaced frame members and a secondary longitudinally extending frame movably positioned between said spaced frame members and normally disposed at an angle with respect thereto, arms pivoted to one end of said longitudinally extending frame and depending therefrom, an axle on said arms and ground engaging wheels on said axle, said secondary longitudinally extending frame having one end thereof pivotally secured to said axle, a tongue pivoted inwardly from its ends to the other end of said longitudinally extending frame and positioned at a substantial angle with respect thereto and having its uppermost end pivotally secured to the other end of said secondary longitudinally extending frame, the lower end of said tongue having hitch means for connection to a tractor, a transverse member on said longitudinally extending frame and a latch on said secondary longitudinally extending frame engageable with said transverse member to hold said arms in substantially vertical position and said tongue at a substantial right angle to said frames and acting when unlatched to permit the secondary longitudinally extending frame to move longitudinally relative to said longitudinally extending frame whereby said arms, axle and wheels move rearwardly and said tongue inclines rearwardly to lower said longitudinally extending frame, means on said longitudinally extending frame for carrying an implement in elevated position when said arms and tongue are in substantially vertical position and said longitudinally extending frame is elevated thereby, and means on said carrier for holding said axle in fixed position to permit lowering and raising of said frames by longitudinal movement imparted to said tongue.

7. The implement carrier as set forth in claim 6 wherein the means for holding the axle and the wheels in fixed position comprise a ground engaging anchor pivoted to said axle.

References Cited in the file of this patent

UNITED STATES PATENTS

| | | |
|---|---|---|
| 889,057 | Steele | May 26, 1908 |
| 2,452,938 | Krake | Nov. 2, 1948 |
| 2,496,153 | Eaves, Jr., et al. | Jan. 31, 1950 |
| 2,517,160 | Alphin, Jr. | Aug. 1, 1950 |
| 2,621,458 | Dauyard | Dec. 16, 1952 |